United States Patent Office 3,194,785
Patented July 13, 1965

3,194,785
VINYL HALIDE RESIN COMPOSITIONS STABI-
LIZED WITH S-TRIAZINE COMPOUNDS
James P. Scullin, Pompton Lakes, N.J., assignor, by mesne
assignments, to Tenneco Chemicals, Inc., a corporation
of Delaware
No Drawing. Filed Oct. 3, 1962, Ser. No. 227,998
8 Claims. (Cl. 260—41)

This application is a continuation-in-part of copending application Serial No. 34,614, now U.S. Patent No. 3,084,135, which was filed on June 8, 1960.

This invention relates to vinyl halide resin compositions. More particularly it relates to vinyl halide resin compositions that are resistant to deteriorating effects of heat.

Vinyl halide resins have properties that make them desirable materials for use in a wide variety of applications. For example, their excellent abrasion resistance, high gloss, and good resistance to water and to alkalies have resulted in their use in floor coverings, wall coverings, shoe soles and heels, and the like. The vinyl halide resins are commonly fabricated into useful articles by the application of heat in milling, calendering, or molding operations. The resins so treated tend to decompose somewhat at the elevated temperatures required as is evidenced by the development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as subsequent prolonged heating of the finished product.

In accordance with the present invention it has been found that products having excellent resistance to thermal degradation result when a phenyl-substituted s-triazine is incorporated into a vinyl halide resin composition. While these compounds can be used to impart heat stability to a wide variety of vinyl halide resin compositions, they are of particular value in those compositions that contain asbestos or another fibrous inorganic filler, such as those that are used in the preparation of floor coverings.

The stabilizers that may be used in the practice of the present invention are phenyl-substituted s-triazines that have the formula

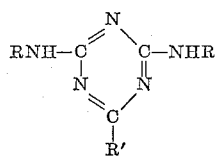

wherein each R represents a hydrogen atom or a phenyl group and R' represents a phenyl group or a phenylamino group. Illustrative of these compounds are benzoguanamine and the phenylmelamines. Salts of the aforementioned compounds may also be used to stabilize the compositions of the present invention. These may include, for example, the carbonate, hydrochloride, nitrate, and sulfate salts. A single stabilizing compound or a mixture of two or more of these compounds may be used in the preparation of the stabilized vinyl halide compositions.

The stabilized vinyl halide resin compositions generally contain approximately 0.3 part to 10 parts and preferably 1 part to 5 parts by weight of the stabilizer per 100 parts by weight of the vinyl halide resin.

The vinyl halide resins that may be used in the compositions of this invention are the resinous products obtained by the polymerization of a vinyl halide in the presence or absence of another polymerizable compound. The term "vinyl halide resin" as used herein includes vinyl halide homopolymers, such as polyvinyl chloride and polyvinyl bromide, as well as copolymers, such as those formed between a vinyl halide and at least one other polymerizable compound, such as vinyl acetate, vinyl propionate, vinyl butyrate, vinylidene chloride, styrene, methyl methacrylate, dialkyl fumarate or maleate, and the like. The vinyl halide used is ordinarily and preferably the chloride, but the bromide and fluoride may also be used. The copolymers useful in the practice of this invention are those prepared from at least 70% of vinyl halide and up to 30% of the other polymerizable compound.

A wide variety of inorganic fillers including both fibrous and non-fibrous fillers may be used in the novel vinyl halide resin compositions. While either type of filler can be used as the sole inorganic filler, the compositions preferably contain both fibrous and non-fibrous fillers.

The fibrous fillers that may be present in the stabilized vinyl halide resin compositions include asbestos and the mineral wools. Asbestos is the most commonly used and the preferred fibrous filler. It is usually present in the composition in the amount of approximately 50 to 200 parts and preferably 80 to 150 parts by weight per 100 parts by weight of the vinyl halide resin. Any of the commercially available grades of asbestos which are commonly used in the preparation of floor covering compositions can be used in the practice of this invention.

The useful non-fibrous inorganic fillers include the many materials that are commonly employed as fillers by the plastics industry. These include, for example, calcium carbonate, calcium sulfate, calcium silicate, barium carbonate, barium sulfate, silica, china clay, kaolin, fuller's earth, and magnesium silicate as well as such pigments as titanium oxide, lead chromate, and iron oxide. The nonfibrous fillers are generally used in amounts ranging from approximately 50 to 300 parts and preferably from 100 to 200 parts by weight per 100 parts by weight of the vinyl halide resin. While a single non-fibrous filler may be used, a mixture of two or more of these fillers which includes at least one pigment is most often used.

In addition to the novel stabilizer and the inorganic filler, the vinyl halide resin compositions may contain other additives that are ordinarily employed in the preparation of such compositions. For example, a plasticizer, such as dioctyl phthalate, dibutyl sebacate, or tricresyl phosphite, is generally used in the amount of approximately 5 to 100 parts by weight per 100 parts by weight of the vinyl halide resin, with approximately 15 to 50 parts preferred. Other heat and light stabilizers for vinyl halide resins, such as metal soaps, metal phenates, and organic phosphites, may also be present in the vinyl halide resin compositions. Extenders, solvents, binders, dyes, and the like may be present in the amounts ordinarily employed for the purposes indicated.

The stabilizers of the present invention may be added to the vinyl halide resin compositions in any convenient way. For example, the vinyl halide resin, stabilizer, and other ingredients may be mixed with or without the aid of a volatile solvent and the resulting mixture milled on rolls at 200° F. to 350° F. until it is homogenous. The stabilized resin may then be removed from the mill in the form of a film or sheet of the desired thickness and may be used as such or subjected to a polishing or embossing treatment.

The invention is further illustrated by the example that follows. It is to be understood, however, that this example is not to be construed as being limitative, but is furnished merely for purposes of illustration.

EXAMPLE

To a mixture of 100 parts by weight of an 80% vinyl chloride-20% vinyl acetate copolymer, 100 parts by weight of asbestos, 160 parts by weight of granular calcium carbonate, 18 parts by weight of dipropylene glycol dibenzoate, 2.5 parts by weight of epoxidized soybean oil, and 12 parts by weight of titanium dioxide was added 1 part by weight of a stabilizer. The mixture was blended at room temperature and then charged to a two-roll steam-heated, differential speed mill whose roll surface temperature was maintained at 300° F. The mixture was milled for 5 minutes and then removed from the rolls as a flexible, homogeneous sheet, 0.045 inch in thickness. For comparative purposes, a similar composition was prepared which contained as stabilizer 1% of 2,4,6-triphenyl-s-triazine, a compound which is related in structure to the stabilizers of the present invention.

To determine their heat stability, 1 x 1 inch specimens of the compositions were placed in a forced-circulation air oven at 300° F., and the specimens were removed periodically until appreciable darkening had taken place. The heat stability ratings of the compositions are given in the table that follows. In this table a numerical scale is used to indicate the color of the specimens with a rating of 1 indicating a pale gray color which is the inherent color imparted by the asbestos and other fillers to the vinyl halide resin and 10 a very dark gray color, the darkening being the manifestation of thermal degradation.

*Heat stability of compositions containing 1% of stabilizer*

| Stabilizer | Color after Indicated Number of Minutes at 300° F. | | | | | | | | | | |
|---|---|---|---|---|---|---|---|---|---|---|---|
| | 0 | 15 | 30 | 45 | 60 | 75 | 90 | 105 | 120 | 135 | 150 |
| Benzoguanamine | 1 | 1 | 2 | 2 | 2 | 2 | 3 | 3 | 3 | 3 | 3 |
| Triphenylmelamine | 2 | 2 | 3 | 3 | 3 | 3 | 3 | 3 | 3 | 3 | 3 |
| 2,4,6-Triphenyl-s-triazine (comparative stabilizer) | 3 | 4 | 8 | 8 | 8 | 8 | 8 | 8 | 8 | 8 | 8 |

The data in the foregoing table show that benzoguanamine and triphenylmelamine when used as stabilizers for asbestos-filled vinyl halide resins formed products having good initial color and heat stability. The comparative stabilizer 2,4,6-triphenyl-s-triazine, on the other hand, formed a composition that had poor heat stability.

I claim:

1. A heat-stable resinous composition comprising a vinyl halide resin, asbestos, and a stabilizer selected from the group consisting of s-triazines having the formula

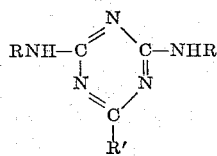

wherein R in each case represents a member selected from the group consisting of a hydrogen atom and a phenyl group and R' represents a member selected from the group consisting of a phenyl group and a phenylamino group; the salts of said s-triazines; and mixtures thereof in the amounts of 50 to 200 parts by weight of asbestos and 0.3 to 10 parts by weight of said stabilizer, all parts per 100 parts by weight of said vinyl halide resin.

2. The heat-stable resinous composition of claim 1 wherein the vinyl halide resin is a vinyl chloride-vinyl acetate copolymer.

3. The heat-stable resinous composition of claim 2 wherein the stabilizer is benzoguanamine.

4. The heat-stable resinous composition of claim 2 wherein the stabilizer is triphenylmelamine.

5. A heat-stable resinous composition comprising a vinyl halide resin, asbestos, a non-fibrous inorganic filler, and a stabilizer selected from the group consisting of s-triazines having the formula

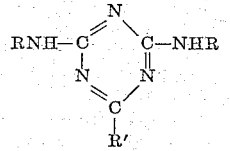

wherein R in each case represents a member selected from the group consisting of a hydrogen atom and a phenyl group and R' represents a member selected from the group consisting of a phenyl group and a phenylamino group; the salts of said s-triazines; and mixtures thereof in the amount of 50 to 200 parts by weight of asbestos, 50 to 300 parts by weight of said non-fibrous inorganic filler, and 1 to 5 parts by weight of said stabilizer, all parts per 100 parts by weight of said vinyl halide resin.

6. A heat-stable resinous composition comprising a vinyl halide resin, asbestos, a non-fibrous inorganic filler component comprising at least one pigment, and a stabilizer selected from the group consisting of s-triazines having the formula

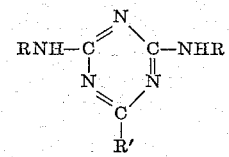

wherein R in each case represents a member selected from the group consisting of a hydrogen atom and a phenyl group and R' represents a member selected from the group consisting of a phenyl group and a phenylamino group; the salts of said s-triazines; and mixtures thereof in the amount of 80 to 150 parts by weight of asbestos, 100 to 200 parts by weight of said non-fibrous inorganic filler component, and 1 to 5 parts by weight of said stabilizer, all parts per 100 parts by weight of said vinyl halide resin.

7. The heat-stable resinous composition of claim 6 wherein the stabilizer is benzoguanamine.

8. The heat-stable resinous composition of claim 6 wherein the stabilizer is triphenylmelamine.

References Cited by the Examiner

UNITED STATES PATENTS 2,720,480  10/55  Wolf _____ 260—249.5
2,837,490   6/58  Hecker _____ 260—41

MORRIS LIEBMAN, *Primary Examiner.*